United States Patent [19]

Beneteau

[11] Patent Number: 4,525,618
[45] Date of Patent: Jun. 25, 1985

[54] RESISTANCE WELDING APPARATUS

[76] Inventor: Donald J. Beneteau, 1333 Front Rd. South, Amherstburg, Ontario, Canada

[21] Appl. No.: 545,477

[22] Filed: Oct. 26, 1983

[51] Int. Cl.³ .............................................. B23K 11/00
[52] U.S. Cl. ....................... 219/89; 219/90; 219/116
[58] Field of Search ................ 219/116, 86.25, 90, 219/89

[56] References Cited

U.S. PATENT DOCUMENTS

| | | | |
|---|---|---|---|
| 1,292,921 | 1/1919 | Thornblade | 219/86.25 |
| 1,663,137 | 3/1928 | Mack | 219/86.25 |
| 2,462,458 | 2/1949 | Beymer | 219/90 |
| 2,465,879 | 3/1949 | Kauder | 219/90 |
| 2,465,880 | 3/1949 | Kauder | 219/90 |
| 3,024,351 | 3/1962 | Parrott | 219/86.25 |
| 4,024,370 | 5/1977 | Sciaky | 219/90 |
| 4,291,214 | 9/1981 | Arthurs et al. | 219/116 |
| 4,410,782 | 10/1983 | Konno et al. | 219/86.25 |

FOREIGN PATENT DOCUMENTS 711830 10/1941 Fed. Rep. of Germany ... 219/86.25

Primary Examiner—Clifford C. Shaw
Attorney, Agent, or Firm—Allen D. Gutchess, Jr.

[57] ABSTRACT

Apparatus for resistance welding is provided. The apparatus includes a transformer, to an output face of which resistance welding electrode holders are connected. The output face has two terminal blocks with threaded openings to receive fasteners for several different designs of electrode holders. The welding electrode holders, being directly connected to the transformer, eliminate the usual heavy cables located between the welding electrode holders and the power source, thereby increasing efficiency through reduction of impedance and secondary loss. The transformer and electrode holders are essentially one unit which can also be moved about to different locations. The welding apparatus is also versatile and compact to meet various applications.

8 Claims, 8 Drawing Figures

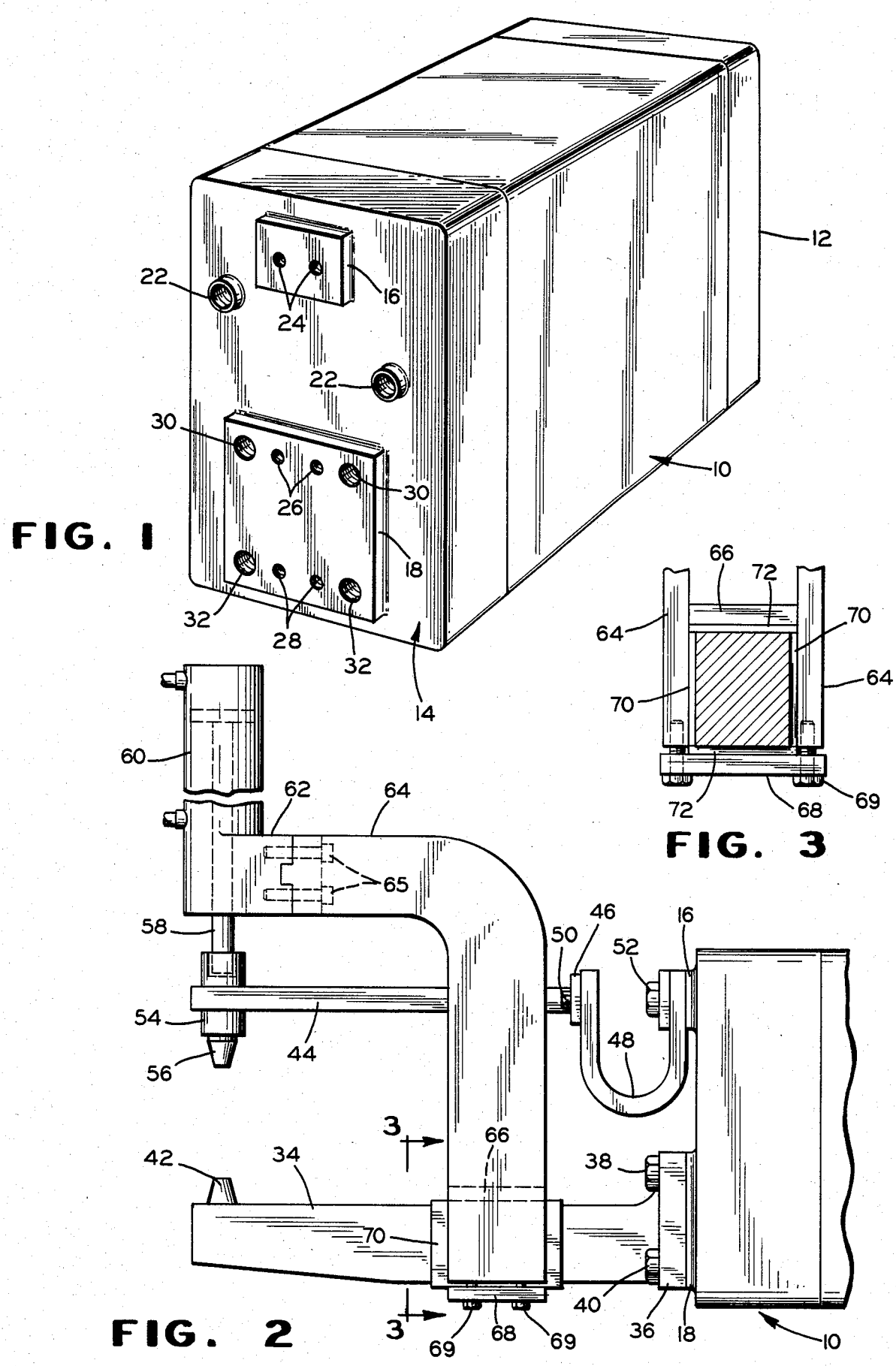

RESISTANCE WELDING APPARATUS

This invention relates to apparatus for resistance welding in which the welding electrode holders and electrodes are close to the power source.

Heretofore, resistance welding apparatus has meant large, cumbersome, immobile, heavy machines incorporating large pressure cylinders for the resistance welding electrodes and a large, often separate, power source. Such apparatus was also expensive and relatively inefficient due to high impedance and secondary losses.

The present invention provides resistance welding apparatus which is compact, versatile, and even can be moved about to various installations. The apparatus incorporates a transformer, directly to an output face of which resistance welding electrode holders are mounted. The close proximity of the power source and electrodes substantially increases the electrical efficiency of the apparatus. Further, pressure intensifier cylinders can be mounted on the electrode holders to provide the necessary high pressures of the electrodes on the workpiece during the welding operation force. Such cylinders are small, light in weight and inexpensive, as compared to the large pressure cylinders which were heretofore usually incorporated into the welding machines.

The transformer has an output face with terminal blocks which are designed to receive several different electrode holders for various applications. These can be electrically connected and supported on the terminal blocks through threaded fasteners without requiring any modifications of the transformer.

It is, therefore, a principal object of the invention to provide resistance welding apparatus which has the features and advantages discussed above.

Another object of the invention is to provide a transformer for resistance welding operations to which different electrode holders can be easily electrically connected.

Other objects and advantages of the invention will be apparent from the following detailed description of preferred embodiments thereof, reference being made to the accompanying drawings, in which:

FIG. 1 is a view in perspective of a transformer with an output face to which electrode holders can be connected;

FIG. 2 is a side view in elevation of part of the transformer of FIG. 1 with resistance welding electrode holders mounted thereon;

FIG. 3 is a view in transverse cross section taken along the line 3—3 of FIG. 2;

Figure 4:
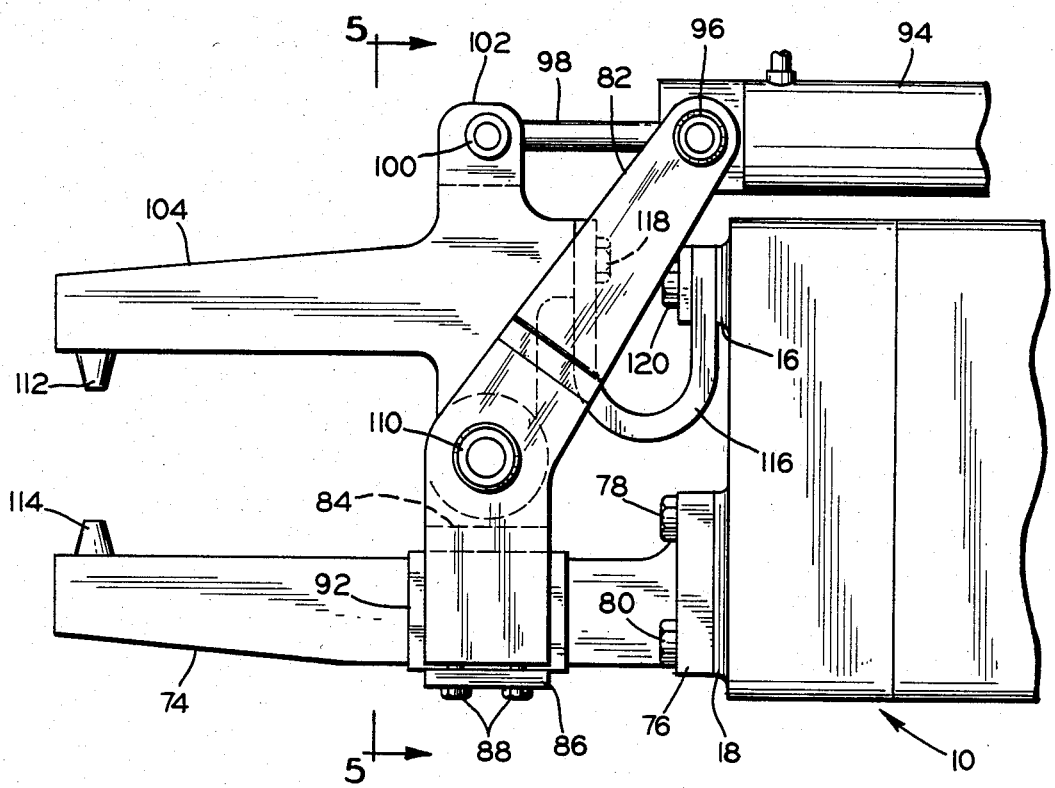
FIG. 4 is a side view in elevation similar to FIG. 2 but showing different resistance welding electrode holders.

Referring particularly to FIG. 1, a transformer embodying the invention is indicated at 10 and is in the shape of a rectangular parallelepiped. The transformer has an input end 12 to which suitable input leads are electrically connected and an output end 14. The output end 14 has an upper terminal block 16, a lower terminal block 18, and two fittings 20 and 22 to receive water lines for water cooling the transformer internally.

The upper terminal block 16 has a pair of threaded holes 24 which are positioned symmetrically with respect to a vertical center line through the block 16.

The lower terminal block 18 has an upper pair of smaller threaded holes 26 and a lower pair of smaller threaded holes 28 which are symmetrically located with respect to both vertical and horizontal center lines of the block 18 and the holes of each pair are spaced apart a distance equal to that between the holes 24. Further, the block 18 has an upper pair of larger threaded holes 30 and a lower pair of larger threaded holes 32 which are similarly symmetrical with respect to the block and are spaced apart a distance exceeding that between the holes 26 or 28.

The faces of both of the blocks 16 and 18 are otherwise smooth and planar. Electrode holders can thereby be mounted on the terminal blocks 16 and 18 with full electrical contact therebetween. Further, the arrangement of the threaded holes in the terminal blocks enables a variety of electrode holders to be mounted thereon, resulting in short electrical paths between electrodes and the power source or transformer to minimize impedance and secondary electrical losses.

One arrangement of electrode holders is shown in FIGS. 2 and 3. A heavy, horizontally-extending electrode holder 34 has an end flange 36 which is mounted directly to the face of the lower terminal block 18 by four machine screws 38 and 40 received in the upper and lower threaded holes 30 and 32. An electrode 42 is located at the other end of the holder 34. A smaller horizontally-extending electrode holder 44 is located above the holder 34. The holder 44 has a mounting flange 46 at one end which is electrically affixed to an end of a U-shaped, laminated shunt 48 by machine screws 50. The other end of the laminated shunt 48 is electrically connected to the upper block 16 by machine screws 52 which are threaded into the holes 24 of the block 16. The laminated shunt 48 is sufficiently flexible to enable the holder 44 to move vertically. The outer end of the holder 44 has a cylindrical connector 54 in which an upper electrode 56 is mounted.

A piston rod 58 of a pressure intensifier cylinder 60 is connected to, but electrically isolated from, the cylindrical connector 54 to move the electrode 56 vertically. The pressure intensifier cylinder 60 can be of this type shown, for example, in my U.S. Pat. No. 4,135,076, issued Jan. 16, 1979, and will not be discussed in detail. It has a rearwardly-extending mounting flange 62 which is affixed to end portions of two supporting arms 64 by machine screws 65. The arms 64, of inverted L-shaped configuration, straddle the lower electrode holder 34 and are spaced apart by a transverse plate 66. A lower clamping plate 68 is fastened to the lower ends of the arms 64 by machine screws 69 and clamps the arms securely on the holder 34 with insulating pads 70 and 72 therebetween.

The transformer along with the electrode holders and the pressure intensifier cylinder enable the overall resistance welding apparatus to be compact, light in weight, inexpensive, and, to a degree, portable as compared to resistance welding machines heretofore known.

Figure 5:
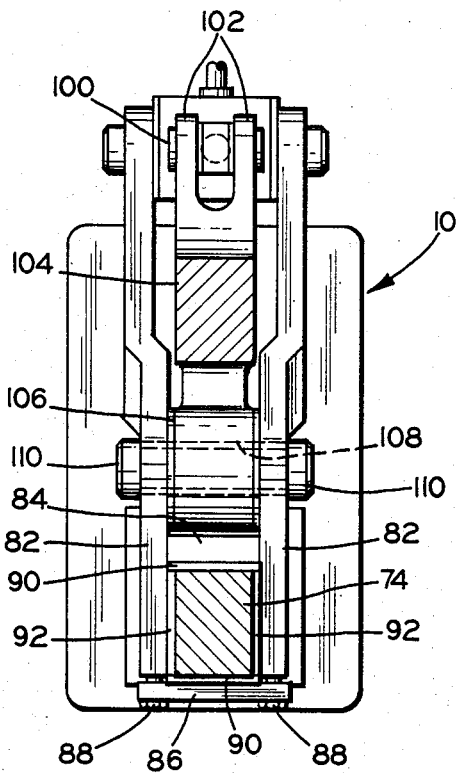
FIG. 5 is a view in transverse cross section taken along the line 5—5 of FIG. 4.

Another resistance welding apparatus including the transformer 10 and modified electrode holder designs is shown in FIGS. 4 and 5. A lower horizontally-extending electrode holder 74 has a large end flange 76 mounted on the lower terminal block 18 by machine screws 78 and 80 which are turned into the threaded holes 30 and 32 (FIG. 1). Two supporting arms 82 extend upwardly and then rearwardly above the electrode holder 74, straddling the holder and being spaced apart by a transverse plate 84. The arms 82 are clamped to the electrode holder 74 by a clamping plate 86 fastened to the ends of the arms by machine screws 88 and electrically isolated from the electrode holder by insulating pads 90 and 92.

A pressure intensifier cylinder 94 which operates in principle similarly to the pressure intensifier cylinder 60 has an end pivotally supported on the upper ends of the supporting arms 82 by suitable pins 96. A piston rod 98 of the cylinder 94 is pivotally connected by pins 100 to upper flanges 102 of an upper, generally T-shaped electrode holder 104. A downwardly-extending arm 106 of the electrode holder 104 has a bore 108 through which suitable pivot pins 110 extend to pivotally support the electrode holder 104 at intermediate portions of the supporting arms 82. The electrode holder 104 thereby can be pivotally moved by the pressure intensifier cylinder 94 to move an upper electrode 112 carried thereby toward and away from a stationary electrode 114 carried by the electrode holder 74. The rear extremity of the electrode holder 104 is electrically connected to a U-shaped, laminated flexible shunt 116 by machine screws 118 with the other end of the shunt 116 electrically connected to the terminal block 16 by machine screws 120 which are turned into the threaded holes 24. Thus, power can be supplied to the electrode holder 104 while enabling pivotal movement thereof.

If desired in some applications, the pivot pins 110 can be extended to the sides and carried by suitable supports whereby the entire transformer 10 along with electrode holders 74 and 104, the pressure intensifier cylinder 94 and related components can all pivot about the axis of the pins 110 and be supported thereby. Suitable permanently oiled bearings along with insulating sleeves and insulating washers are located at pivot points where appropriate and will not be discussed in detail.

Figure 6:
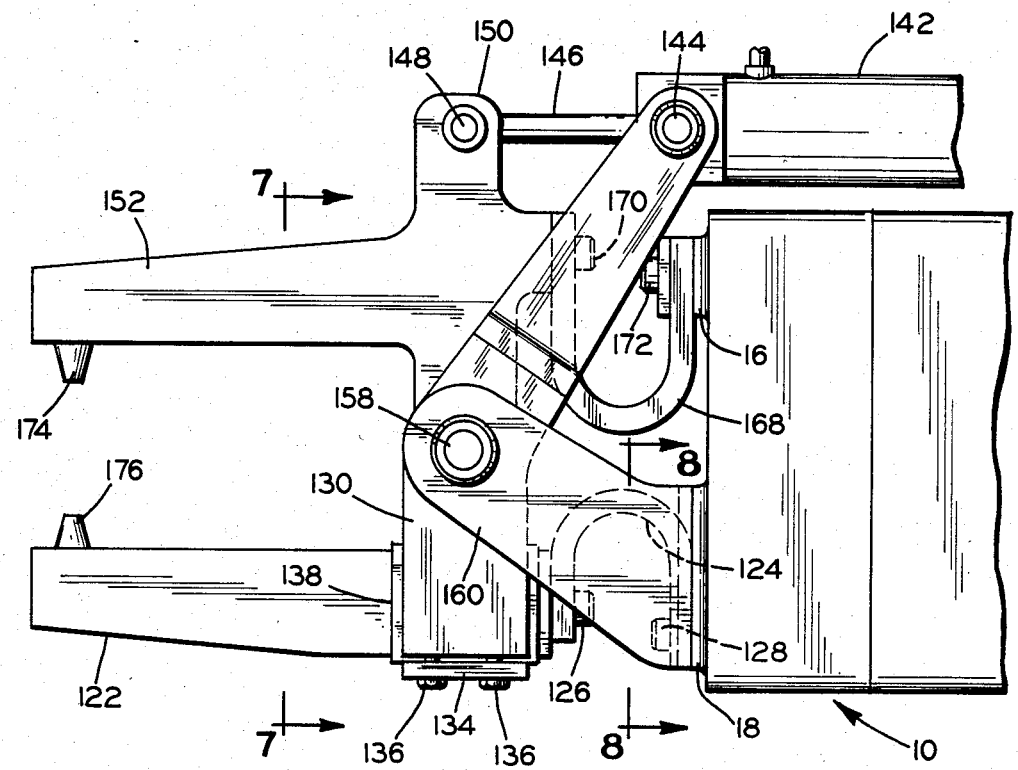
FIG. 6 is a view in elevation similar to FIGS. 2 and 4 but showing still a different set of electrode holders.
Figure 7:
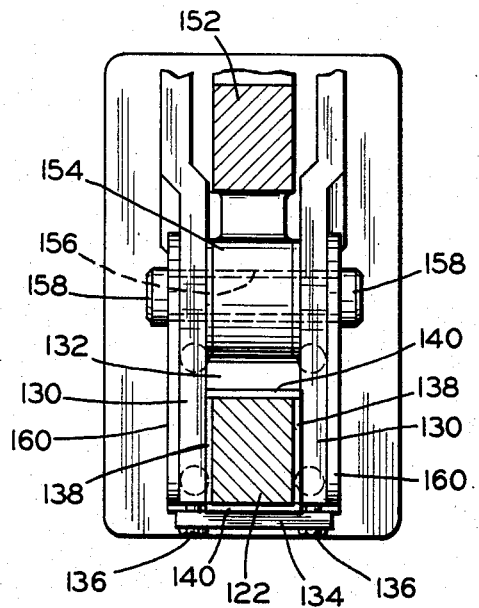
FIG. 7 is a view in transverse cross section taken along the line 7—7 of FIG. 6.
Figure 8:
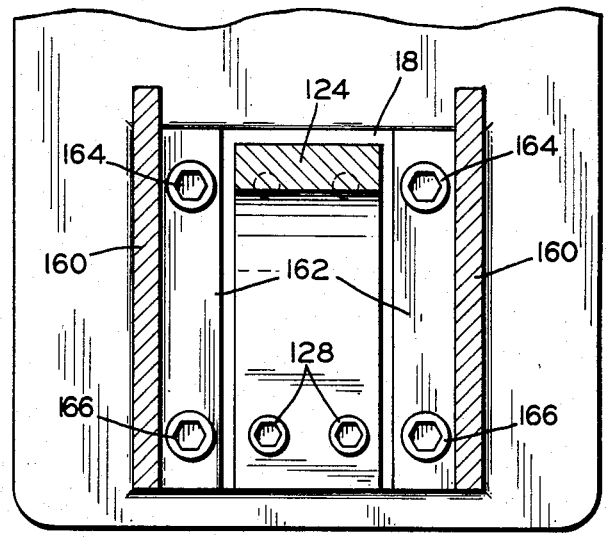
FIG. 8 is an enlarged view in transverse cross section taken along the line 8—8 of FIG. 6.

In the resistance welding apparatus of FIGS. 6-8, both electrode holders can pivotally move. A lower electrode holder 122 has an end electrically affixed to a laminated, inverted U-shaped shunt 124 by machine screws 126. In this instance, the other end of the shunt 124 has machine screws 128 which are turned into the smaller lower threaded holes 28 in the terminal block 18. Two supporting arms 130 extend upwardly and rearwardly from a rear portion of the electrode holder 122, being spaced apart by a transverse plate 132. A clamping plate 134 is connected to lower ends of the arm 130 by machine screws 136 to clamp the arms 130 on the holder 122, being electrically isolated by insulating pads 138 and 140.

A pressure intensifier cylinder 142 is mounted on the upper ends of the arms 130 by pins 144 similar to the arrangement in FIG. 4. A piston rod 146 is pivotally connected by pins 148 to upper flanges 150 of an upper electrode holder 152. The holder 152 has a downwardly-extending arm 154 with a bore 156 through which pins 158 extend to pivotally connect the upper electrode holder 152 with the arms 130. In this instance, the pins 158 also extend through two supporting brackets 160 which pivotally support both of the electrode holders. The brackets 160 have rear mounting flanges 162 which are affixed to the lower terminal block 18 by upper and lower machine screws 164 and 166 which are turned into the threaded holes 30 and 32. The rear of the upper electrode holder 152 is electrically connected to an upper laminated, U-shaped shunt 168 by machine screws 170. The other end of the shunt 168 is electrically connected to the terminal block 16 by machine screws 172 which are turned into the threaded holes 24. Since the holes 24 and the holes 28 are spaced apart the same distance, the sheets 124 and 168 can be of the same size.

Again, suitable permanently oiled bearings, insulating sleeves, and insulating washers are employed at pivot points where appropriate and will not be discussed in detail. If desired, the pivot pins 158 again can be extended to the sides and mounted on suitable supports so that the entire assembly including the transformer, electrode holders, and pressure intensifier cylinder can be pivotally mounted as a unit as well as enabling the electrode holders 122 and 152 to pivot relative to one another to move electrodes 174 and 176 toward and away from one another.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. Apparatus for resistance welding comprising a transformer having an input face and an output face, a first terminal block having a substantially planar surface at one portion of said output face and positioned close to and substantially parallel with said output face, a second output terminal block having a substantially planar surface at another portion of said output face and positioned close to and substantially parallel with said output face, said first terminal block having a pair of threaded holes located symmetrically with respect to a vertical center line of said first block, said second terminal block having a larger surface than said first block, having two pair of threaded holes spaced apart the same distance as said threaded holes of said first terminal block and another two pair of threaded holes spaced apart a distance greater than the spacing between said two threaded holes of said first block, said pairs of threaded holes of said second terminal block being located symmetrically with respect to the vertical center line of said first terminal block, whereby various electrode holders can be electrically connected to and supported by said second terminal block.

2. Apparatus for resistance welding comprising a transformer having an output face, a first output terminal block at one portion of said face, a second output terminal block at another portion of said face, a first welding electrode holder, electrically-conducting means connecting an end portion of said first electrode holder and said first terminal block and enabling movement of said first electrode holder relative to said transformer, a second welding electrode holder electrically connected to said second output terminal block, supported by said second terminal block, and positioned generally parallelly to said first electrode holder, a pressure intensifier cylinder, supporting arms supporting said pressure intensifier cylinder, clamping means clamping said supporting arms on said second electrode holder whereby said pressure intensifier cylinder is supported by said second holder and can be positioned longitudinally along said second electrode holder, said cylinder having a piston rod connected to said first electrode holder for moving a first electrode carried thereby toward and away from a second electrode carried by said second electrode holder.

3. Apparatus according to claim 2 characterized by said pressure intensifier cylinder being pivotally supported by said supporting arms and said piston rod being pivotally connected to said first electrode holder for moving the first electrode carried by said first electrode holder in an arcuate path.

4. Apparatus according to claim 2 characterized by said first electrode holder being pivotally supported by said supporting arms to enable pivotal movement of said first electrode holder relative to said transformer.

5. Apparatus according to claim 2 characterized by said electrically-conducting means being a U-shaped shunt.

6. Apparatus for resistance welding comprising a transformer having an input face and an output face, a first output terminal block having a substantially planar surface at one portion of said output face and positioned close to and substantially parallel with said output face, a second output terminal block having a substantially planar surface at another portion of said output face and positioned close to and substantially parallel with said output face, said first output terminal block having at least two threaded holes located symmetrically with respect to a vertical center line of said first block, said second terminal block having at least two pair of threaded holes located symmetrically with respect to the vertical center line of said first block, a first welding electrode holder, a U-shaped shunt connecting an end portion of said first electrode holder and said first terminal block and enabling movement of said first electrode holder relative to said transformer, a second welding electrode holder electrically connected to said second output terminal block and positioned generally parallelly to said first electrode holder, a pressure intensifier cylinder, said cylinder having a piston rod connected to said first electrode holder for moving a first electrode carried thereby toward and away from a second electrode carried by said second electrode holder, and supporting arms supporting said pressure intensifier cylinder and adjustably affixed along said second electrode holder whereby said pressure intensifier cylinder can be moved along said second electrode holder to align the first and second electrodes.

7. Apparatus according to claim 6 characterized by bracket means affixed to said second output terminal block and pivotally supporting said supporting arms between said second welding electrode holder and said pressure intensifier cylinder and also pivotally supporting said second electrode holder.

8. Apparatus according to claim 6 characterized by said pressure intensifier cylinder being pivotally supported by said supporting arms and said piston rod being pivotally connected to said first electrode holder for moving the first electrode carried by said first electrode holder in an arcuate path.

* * * * *